United States Patent [19]

Pratt et al.

[11] Patent Number: 5,494,248
[45] Date of Patent: Feb. 27, 1996

[54] DRINK SUPPORT FOR A GOLF CART

[76] Inventors: Donald Pratt; Gregg Garychuk, both of 200-606 Broadway Avenue, Winnipeg, Manitoba, Canada, R3C 0W8

[21] Appl. No.: 247,978

[22] Filed: May 23, 1994

[51] Int. Cl.⁶ .................................................. A47K 1/08
[52] U.S. Cl. ................. 248/311.2; 248/205.2; 248/230.8
[58] Field of Search ............... 248/311.2, 231, 248/205.2, 309.1, 291; 224/274

[56] References Cited

U.S. PATENT DOCUMENTS

| | | | |
|---|---|---|---|
| 2,893,675 | 7/1959 | Smith et al. | 248/311.2 X |
| 3,131,842 | 5/1964 | Dingle et al. | 248/311.2 X |
| 4,721,276 | 1/1988 | Moss | 248/311.2 |
| 4,844,399 | 7/1989 | Harm | 248/311.2 |
| 4,915,337 | 4/1990 | Iwasaki | 248/311.2 |
| 4,951,910 | 8/1990 | March | 248/205.2 X |
| 5,152,489 | 10/1992 | Christensen et al. | 248/311.2 |
| 5,199,678 | 4/1993 | Luebke | 248/231 X |
| 5,249,770 | 10/1993 | Louthan | 248/311.2 |
| 5,320,263 | 6/1994 | Kobylack | 248/311.2 X |

*Primary Examiner*—David M. Purol
*Attorney, Agent, or Firm*—Adrian D. Battison; Murray E. Thrift

[57] ABSTRACT

This invention provides a drink support for mounting on a golf cart or the like by which a drink container can be carried on the golf cart and be maintained in an upright orientation despite changes in orientation of the golf cart. The drink container having, a support plate with hook and loop fastening members for attachment to a pole, a swivel having a first swivel part attached to the support plate and a second swivel part pivotal relative to the first swivel part about an axis transverse to the length of the pole, and at least one drink container support member mounted on the second swivel part such that a center of gravity of the support member and drink thereon is lower than the swivel axis so that the drink container is maintained upright by pivotal movement about the swivel axis relative to the plate as the orientation of the pole and plate is varied.

4 Claims, 4 Drawing Sheets

DRINK SUPPORT FOR A GOLF CART

BACKGROUND OF THE INVENTION

The present invention relates to a drink support for mounting on a golf cart or the like by which a drink container can be carried on the golf cart and maintained in an upright orientation despite changes in orientation of the golf cart.

Golfing is a sporting activity requiring replacement of fluids during the golf game. Many golfers therefore wish to carry with them a drink generally in the form of a can of the drink so that the drink can be consumed during the round of golf. Proposals have been made for tubular drink containers which contain a number of drinks cans aligned in a row which are then inserted into a golf bag or carried on the outside of a golf bag to support the drink containers during transportation of the golf bag through the round of golf. However once the drink can is opened, it is difficult for this to be transported without spilling of the drink since changes in orientation of the golf bag cause the drink can be to be tilted and the drink spilled.

Many golfers transport their golf clubs using a golf cart which is pulled by a handle at an upper end of a pole with the lower end of the pole being attached to a wheel trolley arrangement on which the bag is carried. The pole of the golf cart is therefore available for supporting a drink can but the pole of course varies in orientation from the transport or pulling position to the position when the cart is stationary and the clubs pulled from the bag.

SUMMARY OF THE INVENTION

It is one object of the present invention, therefore, to provide a support of a type which can be attached to the pole of a golf cart and which allows the drink can to be transported while accommodating changes in orientation of the pole without allowing spilling of the drink from the can.

According to one aspect of the invention there is provided a support for attachment of a drink container to an elongate generally cylindrical pole comprising a support plate having an inner surface for engagement along a side surface of the pole, two end edges spaced longitudinally of the pole and two side edges spaced transversely of the pole, a pair of straps attached to the plate at positions thereon spaced longitudinally of the pole and extending from one side edge so as to wrap around the pole to an opposed side edge of the plate, a swivel having a first swivel part attached to a plate and said second swivel part pivotal relative to the first swivel part about a swivel axis transverse to the length of the pole, and at least one drink container support member mounted on the second swivel part such that a center of gravity of the drink container support member and a drink container thereon is lower than the swivel axis such that the drink container is maintained upright by pivotal movement about the swivel axis relative to the plate as the orientation of the pole and plate is varied.

Preferably wherein the drink container includes a sleeve member for supporting a drink can, the sleeve member having a generally cylindrical wall with an open upper end and a closed lower end into which a drink can may be inserted, the sleeve member being mounted on said plate.

Preferably wherein the pole has thereon for each strap a first and a second portion of a first hook and loop fastener material and wherein an inner surface of the support plate has thereon a portion of a second hook and loop fastener material for cooperation with a first portion of the first hook and loop fastener material on the pole and wherein the strap has thereon a portion of a second hook and loop fastener material for cooperation with the other of the portions of the first material on the pole and wherein the strap has at an end thereof remote from the support plate a portion of the first hook and loop fastener material for cooperation with a portion of the second hook and loop fastener material on an outer surface of the support plate.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
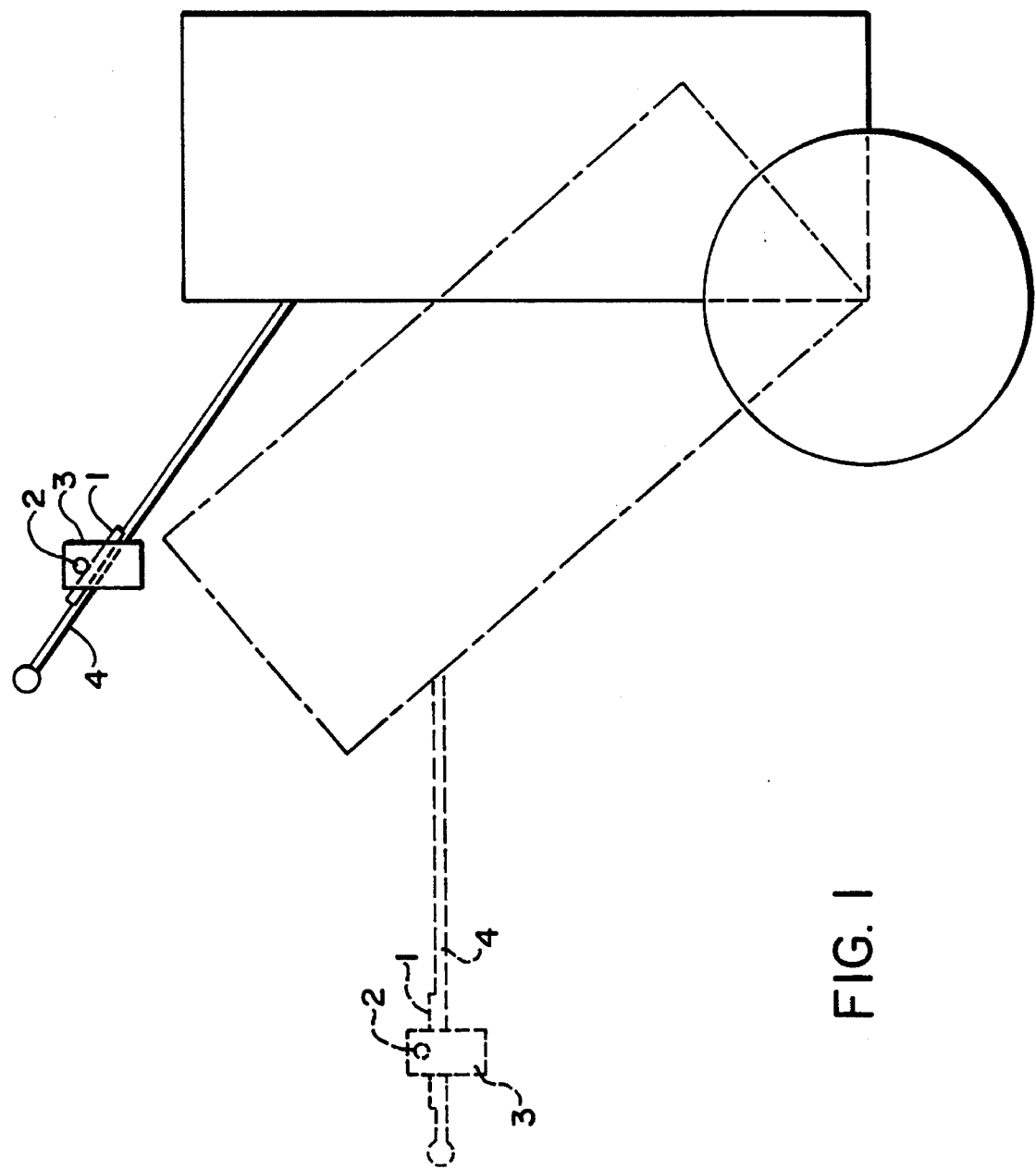
FIG. 1 is a schematic of the drink support mounted on the golf cart.
Figure 2:
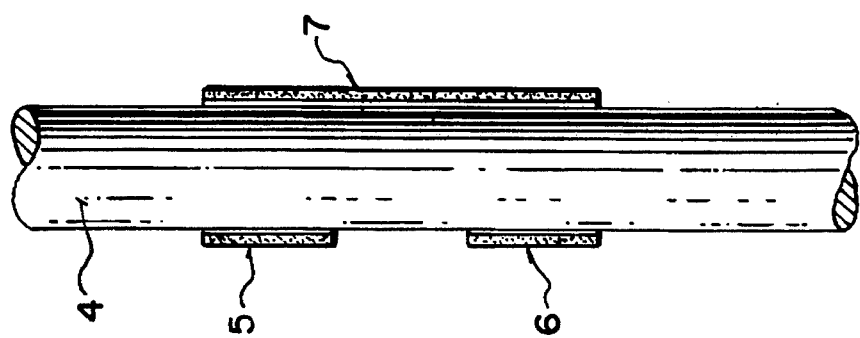
FIG. 2 is a side view of an elongate cylindrical pole.
Figure 4:
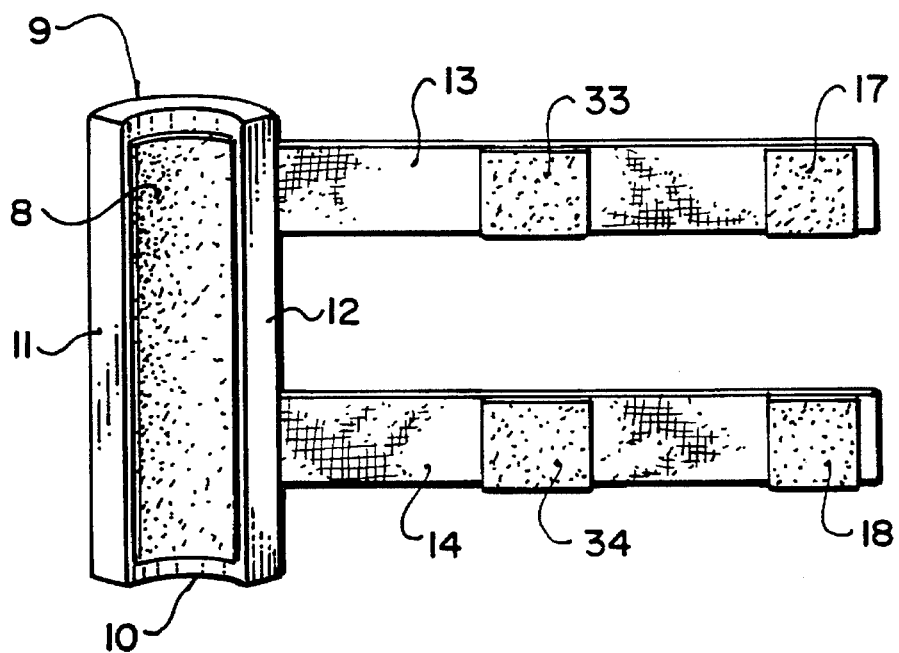
FIG. 4 is a front view of the support plate.
Figures 5, 6:
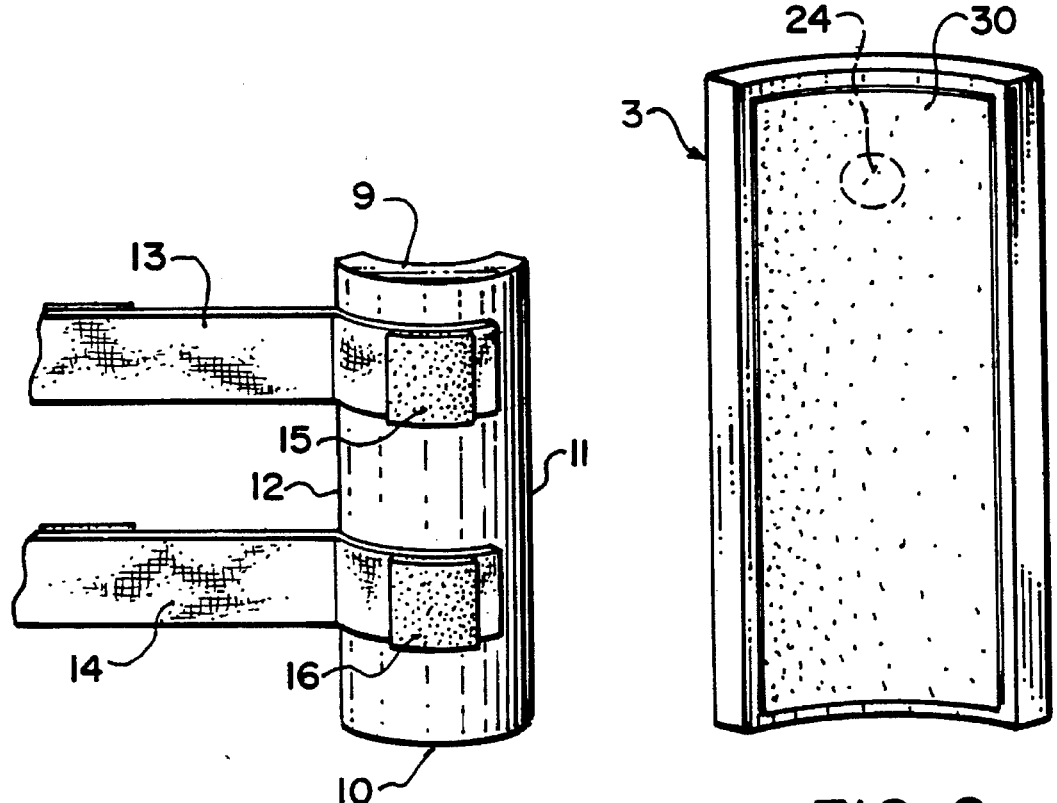
FIG. 5 is a rear view of the support plate.
FIG. 6 is a front view of the container support member showing the hook and loop fastener material.

Referring to FIGS. 1 and 2 the drink support device is shown comprising a supporting plate 1, a swivel mechanism 2, and at least one container support member 3 mounted on an elongate cylindrical pole 4 attached to a golf cart or other means of transport. Fixed by fastening means to the surface of the pole 4 are two sections of a hook and loop fastener material 5, 6, spaced a short distance apart longitudinally therealong. On the side of the pole opposite the before mentioned hook and loop material is another layer of a hook and loop fastener material 7 attached to the pole by fastening means. Referring to FIGS. 4, 5 in the preferred embodiment the supporting plate 1 consists of a part cylinder of an appropriate length, so as to engage partly around the elongate cylindrical pole, with an inner surface having a layer of a hook and loop fastener material 8 fixed to said surface by fastening means, two end edges 9, 10 spaced longitudinally of the pole, and two side edges 11, 12 spaced transversely of the pole, a pair of straps 13, 14 attached by fastening means to the rear of the plate 1 at positions thereon spaced longitudinally of the pole and extending from one side edge so as to wrap completely around the pole to an opposed side edge of the plate wherein each strap includes a layer of a hook and loop fastener material 15, 16 thereon and wherein the strap includes a layer of a hook and loop fastener material 17, 18 thereon for attachment of an outer end of the strap to the rear surface of the support plate by cooperation with the hook and loop material 15, 16 fixed thereon, and wherein the strap includes a layer of a hook and loop fastener material 33, 34 located thereon such that when the strap is in use the material is positioned opposite the support plate.

Figure 3:
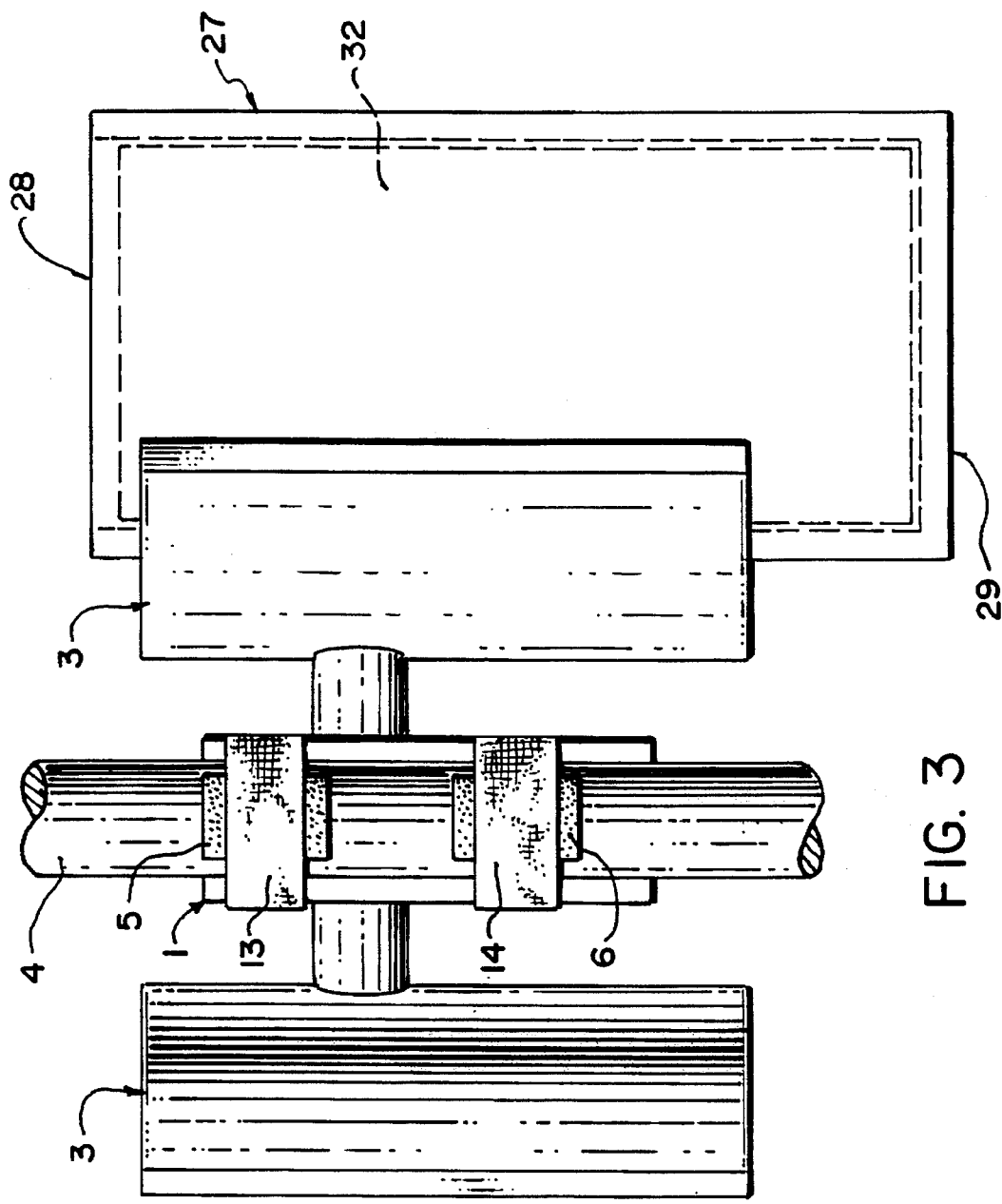
FIG. 3 is a front view of elongate cylindrical pole and the drink support device.
Figure 7:
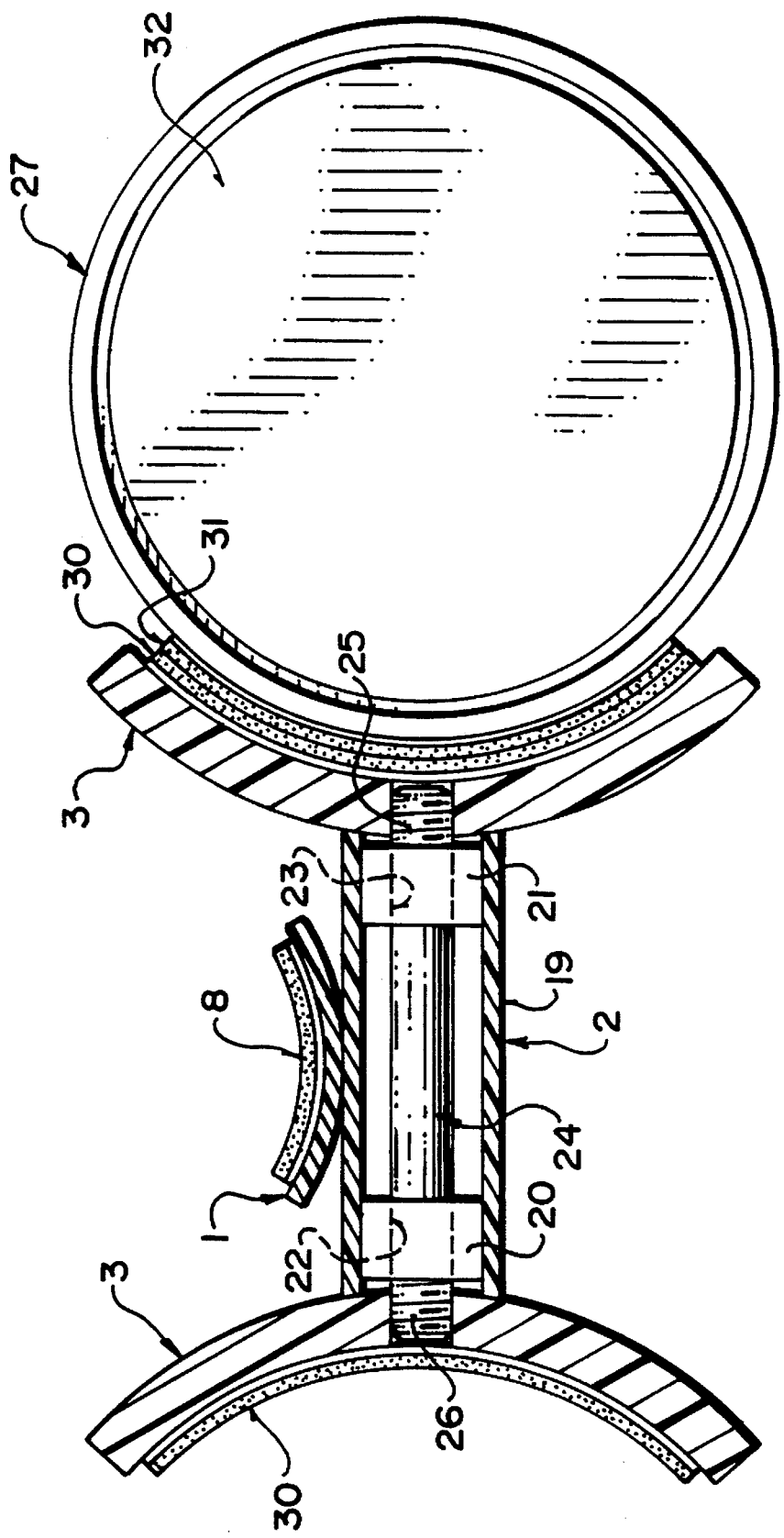
FIG. 7 is a cross sectional top view of the drink support mounted on the elongate pole.

Referring to FIG. 7 a swivel mechanism 2 consists of a tubular first swivel part 19 forming an outer casing attached to the support plate 1 by fastening means, a collar 20, 21 with an opening 22, 23 located centrally is fixed internally at each end of the first swivel part 19 oriented such that each opening and the tube are coaxial. The collars are held in place by an interference fit with the interior walls of the first swivel part. A second swivel part 24 pivotal relative to the first swivel part about a swivel axis transverse to the length of the pole and running through the first swivel part such that the ends of the second swivel part project through the openings in the collars extending past the ends of the first swivel part. Each end of the second swivel part 25, 26 is threaded to allow for attachment of a drink container support member 3 such that a center of gravity of the drink container support member and drink container thereon is lower than the swivel axis such that the drink container is maintained upright by pivotal movement about the swivel axis relative to the plate as the orientation of the pole and plate is varied. Referring to FIGS. 6, 7 the drink container support member 3 consists of a part cylinder of an appropriate length to accommodate a drink, with a threaded hole 24 for mounting to the second swivel part, and a cylindrical sleeve member for supporting a drink 32. The sleeve member 27 can be either an insulated sleeve or any cylindrical fluid containment/insulation vessel which is of the order of 3½. The sleeve member 27 has an open upper end 28 and a closed lower end 29 see FIG. 3 into which a drink can 32 may be inserted, and is mounted on the container support member by a layer of a first hook and loop coupling material 30 fixed by fastening means to the inside surface thereof and wherein the sleeve member includes a layer of a second hook and loop coupling material 31 fixed by fastening means onto an outside surface thereof for mounting of the sleeve member on the part cylindrical plate.

In use the support plate 1 is placed on the pole 4 such that the hook and loop fastener material 8 on the plate cooperates with the hook and loop fastener material 7 on the pole. The straps 13, 14 are wrapped around the pole 4 such that the hook and loop fastener material 33, 34 cooperates with the hook and loop fastener material 5, 6 on the pole 4. This holds the drink support in place on the golf cart. The drink 32 is placed into the sleeve 27, the hook and loop fastener material 31 attached to the sleeve is placed adjacent to and in cooperation with the hook and loop fastener material 30 on the drink container support 3 thereby fixing the drink and sleeve to the drink support member. When the orientation of the pole 4 and plate 1 is varied the drink container is maintained upright by pivotal movement of the second swivel part 24 relative to the first swivel part 19 about the swivel axis relative to the plate 1.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A support for attachment of a drink container to an elongate generally cylindrical pole of a golf cart comprising a support plate having means for attachment of the support plate to the pole, a swivel having a first swivel part attached to the support plate and a second swivel part pivotal relative to the first swivel part about a swivel axis transverse to the length of the pole, and at least one drink container support member mounted on the second swivel part such that a center of gravity of the drink container support member and a drink container thereon is lower than the swivel axis such that the drink container is maintained upright by pivotal movement about the swivel axis relative to the support plate as the orientation of the pole and the support plate is varied the drink container support member comprising a mounting plate and a sleeve member for supporting a drink can, the sleeve member having a generally cylindrical wall with an open upper end and a closed lower end into which the drink can may be inserted, the sleeve member being removably attached to the mounting plate by a first hook and loop element carried on the mounting plate and a second hook and loop element carried on the sleeve.

2. The support according to claim 1 wherein there are provided two drink container support members each arranged on a respective side of the support plate.

3. The support according to claim 1 wherein the mounting plate is part cylindrical with a radius of curvature following that of the sleeve member.

4. A support for attachment of a drink container to an elongate generally cylindrical pole of a golf cart comprising a support plate having means for attachment of the support plate to the pole, a swivel having a first collar attached to the support plate on a side thereof opposite to the pole and a pin extending through the collar and pivotal relative to the collar about a swivel axis transverse to the length of the pole, and at least one drink container support member mounted on the pin such that a center of gravity of the drink container support member and a drink container thereon is lower than the swivel axis such that the drink container is maintained upright by pivotal movement about the swivel axis relative to the support plate as the orientation of the pole and the support plate is varied the drink container support member comprising a mounting plate fixedly attached to one end of the pin with the pin substantially at a right angle to the mounting plate for swiveling movement therewith and a sleeve member for supporting a drink can, the sleeve member having a generally cylindrical wall with an open upper end and a closed lower end into which the drink can may be inserted, the mounting plate consisting solely of a part cylindrical plate defining a concave surface with a radius of curvature following that of the sleeve member, the sleeve member being removably attached to the mounting plate by a first element of a hook and loop coupling carried on and substantially covering a whole of the concave surface of the mounting plate and a second element of the hook and loop coupling carried on the sleeve.

\* \* \* \* \*